United States Patent [19]
Harrington

[11] Patent Number: 6,115,493
[45] Date of Patent: Sep. 5, 2000

[54] TECHNIQUE FOR FAST COMPUTATION OF HIGHLIGHT COLOR MAPPINGS

[75] Inventor: Steven J. Harrington, Webster, N.Y.

[73] Assignee: Xerox Corporation, Stamford, Conn.

[21] Appl. No.: 09/129,157

[22] Filed: Aug. 5, 1998

[51] Int. Cl.[7] .................................................. G06K 9/00
[52] U.S. Cl. ................................................................ 382/162
[58] Field of Search ..................................... 382/162, 164, 382/165, 166; 358/520, 523; 345/199

[56] References Cited

U.S. PATENT DOCUMENTS

| | | |
|---|---|---|
| 5,237,517 | 8/1993 | Harrington et al. . |
| 5,410,331 | 4/1995 | Schuneman ............................. 345/150 |
| 5,982,924 | 11/1999 | Power et al. ............................. 382/162 |

*Primary Examiner*—Phuoc Tran
*Attorney, Agent, or Firm*—Fay, Sharpe, Fagan, Minnich & McKee, LLP

[57] ABSTRACT

An image-processing system (20) for mapping full-color images to highlight-color images includes an image-input terminal (30). The image-input terminal (30) reads an image represented in a full-color scheme defined by a three-dimensional color space. An image-processing unit (40) samples the image to obtain a sample color. The image-processing unit (40) maps the sample color from the full-color scheme to a highlight-color scheme. The highlight-color scheme is defined by a two-dimensional color space that includes a highlight-color component and a base-color component. The image-processing unit (40) includes at least a first two-dimensional look-up table (42), which is used in mapping the sample color from the full-color scheme to the highlight-color scheme. Finally, an image-output terminal renders the image in the highlight-color scheme.

23 Claims, 3 Drawing Sheets

TECHNIQUE FOR FAST COMPUTATION OF HIGHLIGHT COLOR MAPPINGS

BACKGROUND OF THE INVENTION

The present invention relates to the art of color image processing. It finds particular application in conjunction with digital highlight color printers and copiers, and will be described with particular reference thereto. However, it is to be appreciated that the present invention is also amenable to other like applications.

Mapping full-color images to black and white allows rendering and/or reproduction of the full-color image without the associated costs of color processing. That is to say, generally, monochromatic, or black and white, rendering and/or reproduction are faster and more economical than full color. Additionally, full-color processing may not always be available. Likewise, it is advantageous to be able to map full-color images to a highlight-color scheme. Highlight-color schemes, such as those produced by the Xerox 4850 Highlight Color Printer, generally include only two color separations as opposed to the three, four, or more separations commonly associated with full-color image processing. One such technique for mapping full-color images to highlight-color images is disclosed in commonly assigned U.S. Pat. No. 5,237,517, incorporated herein by reference.

As indicated earlier, images rendered in a highlight-color scheme are typically portrayed by two color separations, a highlight color (usually a primary color) and a base color (usually black or white). On the other hand, in a full-color image, the gamut of colors includes tints and shades of the full color spectrum—reds, greens, blues, and their combinations. The gamut of full colors is commonly represented by a three-dimensional volume or color space which takes the form of the double hexagonal cone 10 illustrated in FIG. 1. In this representation, shade or luminance varies from dark to light along the vertical axis, tint varies from unsaturated grays to fully saturated colors along the radial axis, and hue varies angularly in the horizontal plane. The gamut of colors available in a highlight-color scheme is represented by the two-dimensional triangle 12 illustrated in FIG. 2. This two-dimensional triangle 12 represents a slice from the full-color double hexagonal cone 10 at the angle of the hue being used for the highlight color.

The mapping from full color to highlight color is analogous to mapping from the three-dimensional double hexagonal cone 10 to the two-dimensional triangle 12. In such a mapping, many different colors in the full-color space are mapped to the same color in the highlight-color space, and information is lost. It is advantageous then to have a mapping that preserves the information that is most important, thus minimizing damage due to the loss of information that occurs when mapping from a three-dimensional color space to a two-dimensional color space. The information that should be preserved depends on the type of image and how color is being used. For pictorial images, such as photographs and the like, most of the information is in the luminance. Of secondary importance is the hue. However, in presentation images, such as graphs, charts, and the like, the information is often in the hue. In this application, usually strongly saturated colors are selected for impact, and hue is used to differentiate elements of the image. Colors that differ in luminance as well as hue are often selected to increase their distinguishability. When color is used to distinguish an object, the information lies in the fact that the object is colored and not neutral. In any event, different aspects of the color space are important in different applications.

Prior art techniques for mapping full-color images into a highlight-color space generally use complex computations and/or large three-dimensional look-up tables. This being the case, the prior art techniques have a number of inherent drawbacks. One such drawback is that the complex computations are relatively time consuming and often become a bottleneck which slows the rendering process. Additionally, large three-dimensional look-up tables are relatively burdensome and costly. Measures taken to reduce the size of the three-dimensional look-up table also tend to reduce quality and/or performance. Moreover, due to its size, large amounts of memory are allocated to store the three-dimensional look-up table.

The present invention contemplates a new and improved mapping technique, which overcomes the above-referenced problems and others.

SUMMARY OF THE INVENTION

In accordance with one aspect of the present invention, a method of image processing for mapping full-color images to highlight-color images is provided. It includes reading an input image and sampling the image to obtain a sample color. Table access values are obtained from values that define the sample color. Using a two-dimensional look-up table accessed by the access values, an amount of highlight color that corresponds to the sample color is determined. In addition, an amount of base color that corresponds to the sample color is also determined, and the image is rendered with the highlight and base colors in accordance with their determined amounts.

In accordance with a more limited aspect of the present invention, the input image is a pictorial image, and the method further comprises learning the sample colors Y, E, and S coordinate values in a YES color space where Y represents luminance, E represents chrominance along a red-green color scale, and S represents chrominance along a yellow-blue color scale.

In accordance with a more limited aspect of the present invention, the sample colors E and S coordinate values are used to access the first two-dimensional look-up table.

In accordance with a more limited aspect of the present invention, the first two-dimensional look-up table is constructed such that values contained therein satisfy the following relationship:

$$h = \text{MAX}\left\{0, \frac{(E_h E_s + S_h S_s)^3}{(E_s^2 + S_s^2)(E_h^2 + S_h^2)^2}\right\}$$

wherein h is the amount of the highlight color, MAX is a function that returns a value equal to that of its highest argument, $E_s$ is the sample color's E coordinate value, $S_s$ is the sample color's S coordinate value, $E_h$ is an E coordinate value of the highlight color in the YES color space and $S_h$ is an S coordinate value of the highlight color in the YES color space.

In accordance with a more limited aspect of the present invention, the amount of the base color is determined according to the following relationship:

$$k = \text{MAX}\{0, C_{max} - h - Y_s + hY_h\}$$

wherein k is the amount of the base color, $C_{max}$ is a maximum of a range of possible coordinate values, $Y_s$ is the sample color's Y coordinate value, and $Y_h$ is a Y coordinate value of the highlight color in the YES color space.

In accordance with a more limited aspect of the present invention, a second two-dimensional look-up table is used for determining the amount of the base color that corresponds to the sample color.

In accordance with a more limited aspect of the present invention, the sample color's Y coordinate value and the determined amount of the highlight color are used to access the second look-up table.

In accordance with a more limited aspect of the present invention, the image is read in a RGB color space such that the sample color obtained during sampling is defined by an R coordinate value which represents an amount of red, a G coordinate value which represents an amount of green, and a B coordinate value which represents an amount of blue.

In accordance with a more limited aspect of the present invention, the step of learning further includes calculating the sample colors Y, E, and S coordinate values according to the following relationships:

$$Y = \frac{R}{4} + \frac{11G}{16} + \frac{B}{16};$$

$$E = \frac{R-G}{2}; \text{ and,}$$

$$S = \frac{R+G}{4} - \frac{B}{2}.$$

In accordance with more limited aspect of the present invention, the input image is a presentation image and the step of obtaining includes determining values for terms m, d, and q wherein the term m represents an amount of white present in the sample color, the term d represents a saturation measure of the sample color, and the term q represents a hue measure of the sample color scaled by d.

In accordance with a more limited aspect of the present invention, the terms d and q are used to access the first look-up table.

In accordance with a more limited aspect of the present invention, the value of the term m is subtracted from a value retrieved from a second two-dimensional look-up table accessed with the terms d and q to find the amount of the base color corresponding to the sample color.

In accordance with a more limited aspect of the present invention, the value of the term m is determined such that it is a minimum of the R, G, and B coordinate values of the sample color.

In accordance with a more limited aspect of the present invention, the value of the term d is determined such that it is the difference between a maximum and a minimum of the R, G, and B coordinate values of the sample color.

In accordance another aspect of the present invention, an image-processing system for mapping full-color images to highlight-color images includes an image-input terminal which reads an image represented in a full-color scheme defined by a three-dimensional color space. An image-processing unit samples the image to obtain a sample color and maps the sample color from the full-color scheme to a highlight-color scheme defined by a two-dimensional color space that includes a highlight color and a base color. The image-processing unit includes at least a first two-dimensional look-up table, which is used in mapping the sample color from the full-color scheme to the highlight-color scheme. An image-output terminal renders the image in the highlight-color scheme.

In accordance with a more limited aspect of the present invention, the first two-dimensional look-up table is used to determine an amount of the highlight color that corresponds to the sample color.

In accordance with a more limited aspect of the present invention, the image-processing unit further includes a second two-dimensional look-up table, which is used in mapping the sample color from the full-color scheme to the highlight-color scheme.

In accordance with a more limited aspect of the present invention, the second two-dimensional look-up table is used to determine an amount of the base color that corresponds to the sample color.

One advantage of the present invention is its improved efficiency in mapping colors from a three-dimensional full-color space to a two-dimensional highlight-color space.

Another advantage of the present invention is that it is relatively less expensive than mapping techniques which employ three-dimensional look-up tables.

Yet another advantage of the present invention is that less memory is used for the mapping operation.

Another advantage of the present invention is that the computations are simplified.

Another advantage of the present invention is that it achieves high-quality, efficient mapping from full color to highlight color for both pictorial and presentation images.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DETAILED DESCRIPTION OF THE PREFERRED EMBODIMENTS

Figure 3:
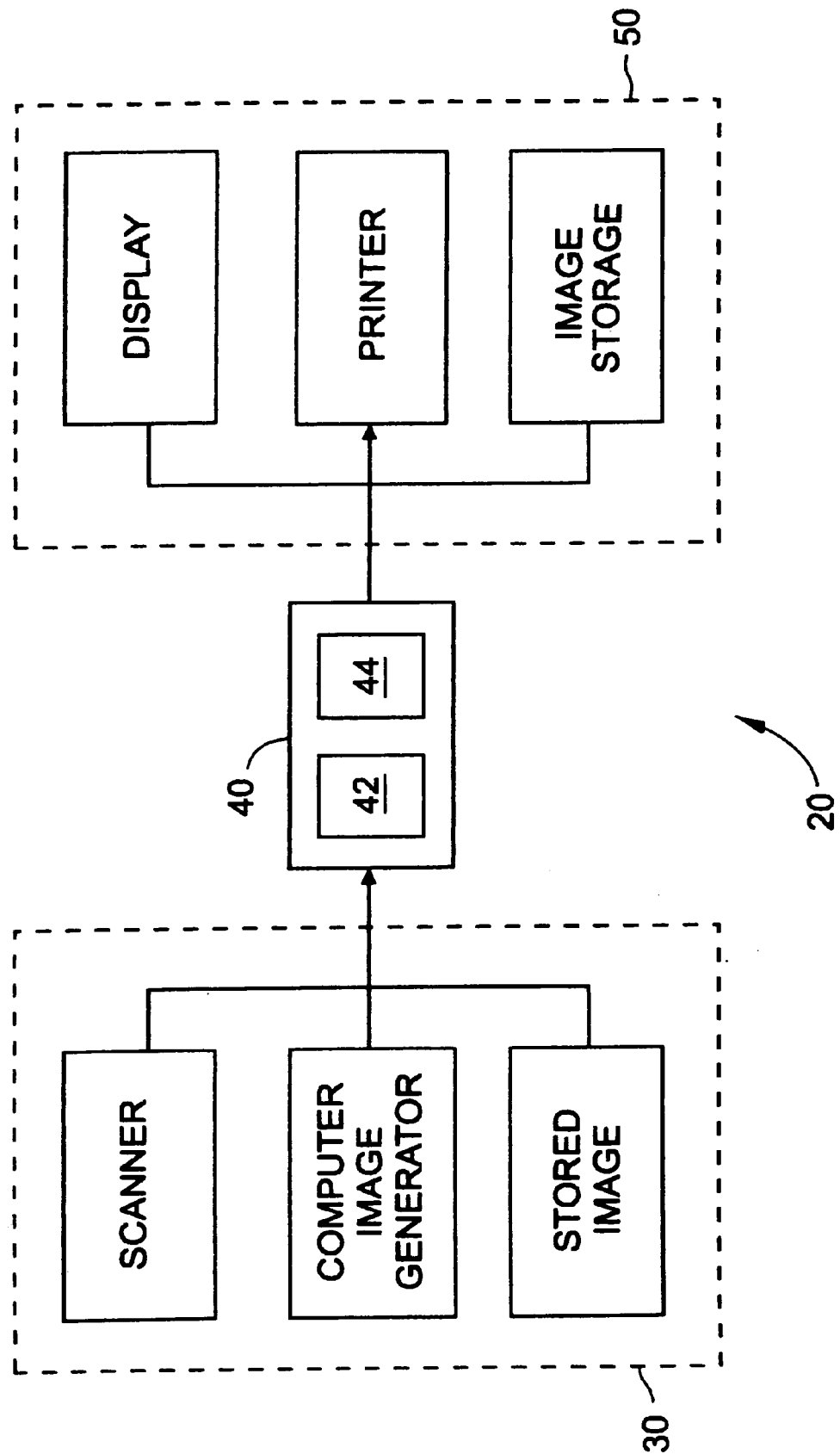
FIG. 3 is a diagrammatic illustration of an image-processing system in accordance with aspects of the present invention; and, FIG. 4 is a flow chart showing the mapping of a full-color image to a highlight-color image in accordance aspects of the present invention.

With reference to FIG. 3, an image-processing system 20 employs an image-input terminal 30 to read, retrieve, or otherwise receive an input image portrayed in a full-color scheme. The image-input terminal 30 optionally includes one or more suitable image-input devices such as an electronically or otherwise stored image reader, a computer image generator, a scanner, or the like. In a preferred embodiment, the full-color scheme of the input image is defined by a three-dimensional color space. More specifically, each color sample from the input image is defined in terms of assigned values for its color coordinates. For example, in an RGB color space, the coordinates are R (representing an amount of red present in the color sample), G (representing an amount of green present in the color sample), and B (representing an amount of blue present in the color sample). Alternately, in a CMY color space, the coordinates are C (representing an amount of cyan present in the color sample), M (representing an amount of magenta present in the color sample), and Y (representing an amount of yellow present in the color sample). In a preferred embodiment, the values assigned to each of the color coordinates range from 0 (representing no color present or off) to 1 (representing a maximum amount of color present or full on). Alternately, other ranges are employed as desired for particular applications. For example, each color coordinate is optionally expressed as a single 8 bit data value which has a range of values extending from 0 (i.e. no color) to 255 (i.e. maximum color).

Figure 1:
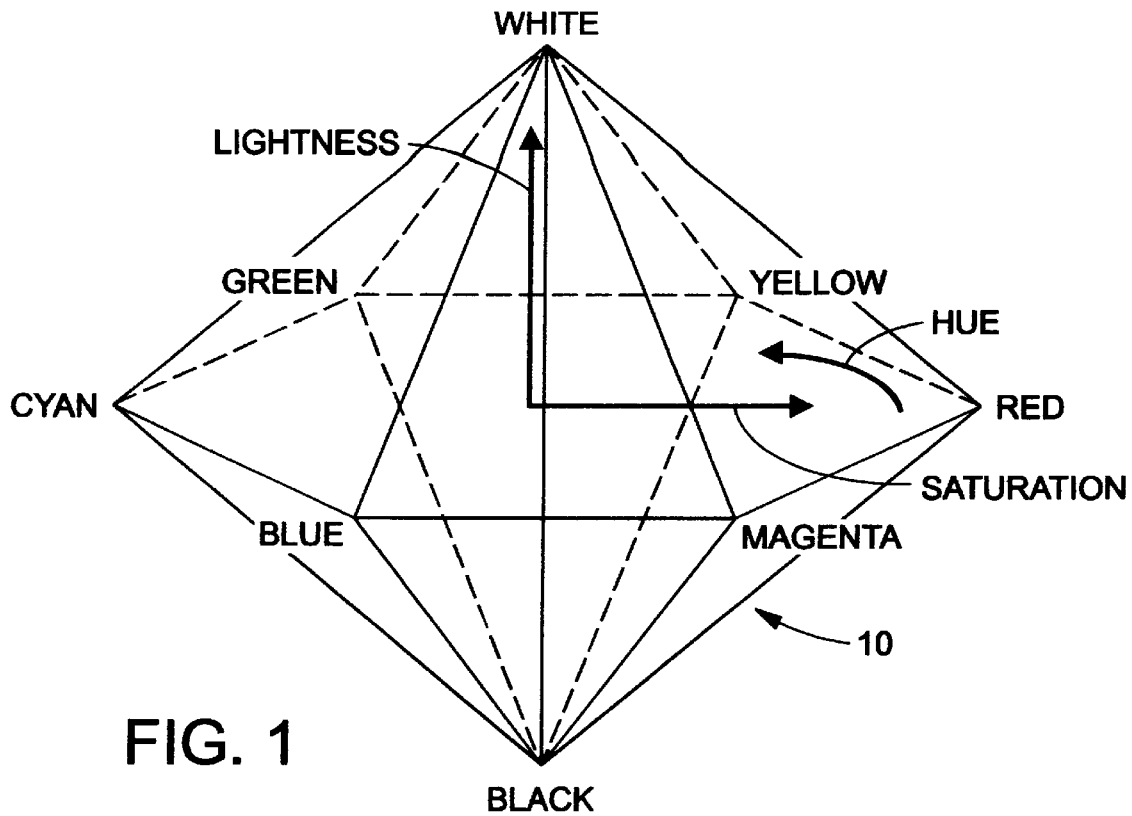
FIG. 1 is a diagrammatic illustration of a three-dimensional full-color space.
Figure 2:
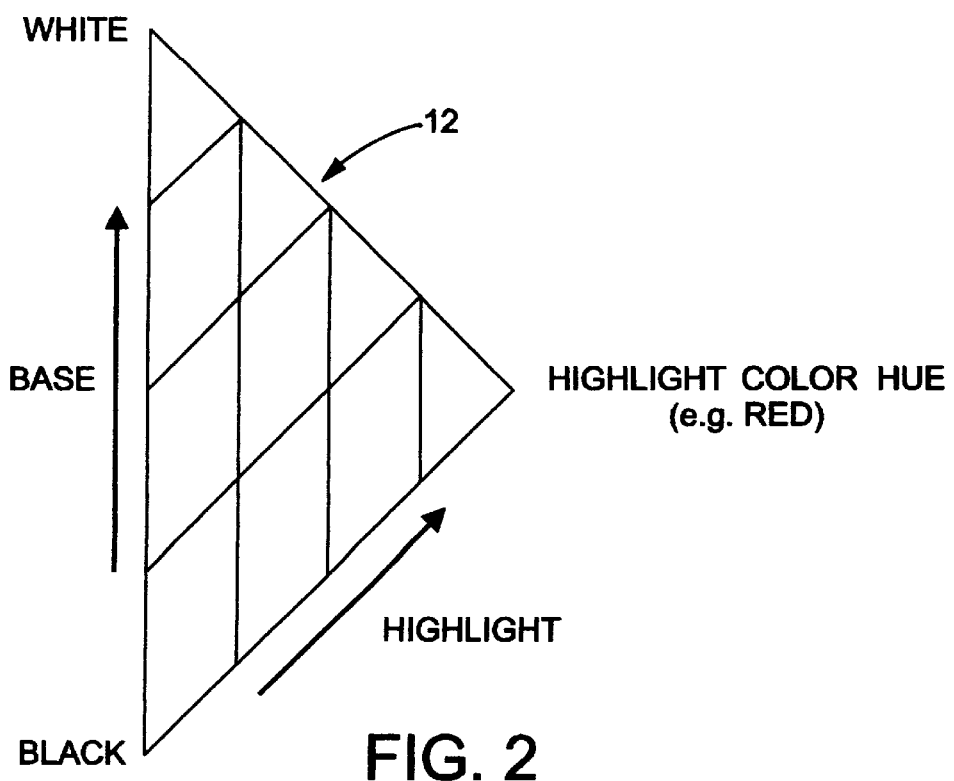
FIG. 2 is a diagrammatic illustration of a two-dimensional highlight-color space.

An image-processing unit 40 samples the input image from the image-input terminal 30 to obtain the sample color. The image-processing unit 40 then maps the sample color from the full-color scheme to a highlight-color scheme having two color separations—one being the highlight color, and the other being the base color. More specifically, based on the sample color the image-processing unit 40 accesses one or both two-dimensional look-up tables 42 and 44 to determine amounts of highlight and base colors, respectively, that correspond to the sample color. In a preferred embodiment, the highlight color is optionally a primary color such as red, green, blue, cyan, yellow, or magenta or another appropriate color, and the base color is black or white. Alternately, any two color combinations are employed. In this manner, the three-dimensional color space represented by the hexagonal cone 10 (see FIG. 1) is mapped to the two-dimensional color space represented by the triangle 12 (see FIG. 2).

An image-output terminal 50 receives the image from the image-processing unit 40 and renders the image in the highlight-color scheme using the amounts of highlight and base colors determined by the image-processing unit 40. Optionally, the image-output terminal 50 includes one or more appropriate rendering engines such as an image storage device, a digital printer, a laser printer, a display, or the like.

Figure 4:
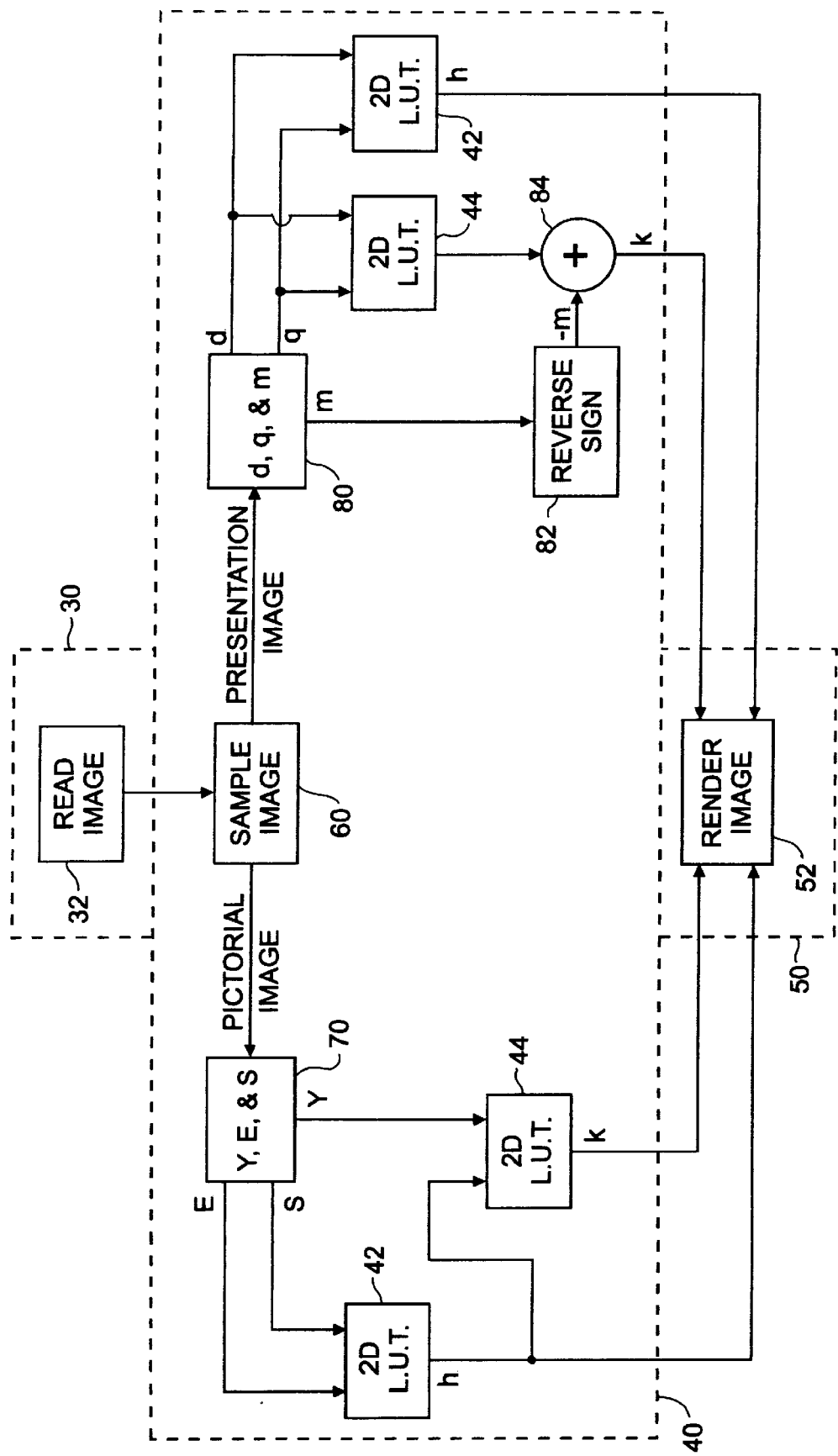

With reference to FIG. 4 and continuing reference to FIG. 3, the image processing technique of the present invention is responsive to the type of image being processed. The response to the type of image being processed is manually selected by an operator or, alternatively, it is automatically selected based upon a detection of the image being processed. Optionally, dedicated or separate image-processing units 40 are used for each type of image. The types of images include pictorial images, such as photographs and the like, and presentation images, such as presentation graphics, charts, graphs, and the like.

Pictorial Images

In a preferred embodiment, the technique for processing pictorial images breaks down into six basic steps. The first step, indicated at box 32, is to read the input image via image-input terminal 30 as discussed above. The second step, indicated at box 60, is to sample the image and obtain a sample color.

The third step in the process, indicated at box 70, is to determine, calculate, or otherwise learn the sample color's coordinate values in a luminance/chrominance color space, such as an L*a*b*, L*u*v*, YES, or other like color space which defines its colors in terms of luminance and chrominance. In a preferred embodiment, the YES color space is used due to the ease of the associated calculations, however, in systems where other luminance/chrominance coordinates are readily available, these coordinates are substituted for YES. In the YES color space, Y represents luminance, E represents chrominance along a red-green color scale, and S represents chrominance along a yellow-blue color scale. In some applications, the sample color may already be represented in terms of its Y, E, and S coordinates (i.e. the input image was read in YES color space and/or it was previously converted to Y, E, and S coordinates) in which case the third step is trivial. However, for applications where the sample color is defined by particular color coordinate values, conversion calculations are employed. For example, where the sample color is defined by R, G, and B color coordinates, $Y=0.253R+0.684G+0.063B$, $$E = \frac{R-G}{2},$$

and $$S = \frac{R+G}{4} - \frac{B}{2}.$$

Using software shift and add/substract instructions or alternately hardware bit shifters and adders/subtractors, E and S are calculated according to the above equations and Y is closely approximated by:

$$Y = \frac{R}{4} + \frac{11G}{16} + \frac{B}{16}. \tag{1}$$

In a preferred embodiment, a software implementation in the C programming language is as follows:

S =(( E = ((R-G)>>1))-(T=B-G))>>1; and,
Y = G + (E>>1) + (T>>4),
where the shift function ">>n" operates as a divide by $2^n$.

The fourth step is to access the first two-dimensional look-up table 42 with the E and S coordinate values to determine the amount of highlight color to use for the corresponding sample color. The first two-dimensional look-up table 42 is loaded with an array of values for highlight-color amounts that correspond to possible combinations of the E and S values of a corresponding array of sample colors. In a preferred embodiment, the first two-dimensional look-up table 42 is constructed so that the values contained therein satisfy the following relationship:

$$h = \text{MAX}\left\{0, \frac{(E_h E_s + S_h S_s)^3}{(E_s^2 + S_s^2)(E_h^2 + S_h^2)^2}\right\}, \tag{2}$$

wherein h is the amount of the highlight color, MAX is a function that returns a value equal to that of its highest argument, $E_s$ is the sample color's E coordinate value, $S_s$ is the sample color's S coordinate value, $E_h$ is an E coordinate value of the highlight color in the YES color space, and $S_h$ is an S coordinate value of the highlight color in the YES color space. In th is manner, the amount of the highlight color to use is determined.

The fifth step is to access the second two-dimensional look-up table 44 with the Y coordinate value of the sample color and its recently determine corresponding h value to determine the amount of base color to use for the sample color. The second two-dimensional look-up table 44 is loaded with an array of values for base color amounts that correspond to possible combinations of the Y and h values of a corresponding array of sample colors. In a preferred embodiment, the second two-dimensional look-up table 44 is constructed so that the values contained therein satisfy the following relationship:

$$k=\text{MAX}\{0, C_{max}-h-Y_s+hY_h\} \tag{3},$$

wherein k is the amount of the base color, $C_{max}$ is a maximum of a range of possible coordinate values (for example, 1 or 255), $Y_s$ is the sample color's Y coordinate value, and $Y_h$ is a Y coordinate value of the highlight color in the YES color space. Alternately, rather than employing the second two-dimensional look-up table 42, being th at the calculation is relatively simple, the amount of base color k can be calculated for each sample color on the fly using equation (3). In this manner, the amount of the base color to use is determined.

Finally, the sixth step, indicated at box 52, is rendering the image via the image-output terminal 50 in the highlight-color scheme using the highlight and base colors in the amounts determined by the image-processing unit 40.

Presentation Images

In a preferred embodiment, the technique for processing presentation images also breaks down into six basic steps. The first and second steps, indicated at boxes 32 and 60, are the same as those for pictorial images as discussed above.

The third step in the process, indicated at box 80, is to determine, calculate, or otherwise learn the value of the terms d, q, and m for the sample color. The m term serves as a measure of the amount of white in the sample color. The d term serves as a saturation measure of the highlight color in the sample color. The q term serves as a measure of the hue of the sample color scaled by the d term. For example, where the sample color is defined in terms of R, G, and B color coordinates, the m term is defined as the minimum amount of the R, G, and B color coordinate values; the d term is defined as the difference between the maximum and minimum amounts of the R, G, and B color coordinate values; and the q term is define such that it is a value selected in response the identity of the maximum (optionally the intermediate) of the R, G, and B color coordinate values, which selected value is adjusted by the amount of the intermediate of the R, G, and B color coordinate values less the amount of the minimum of the R, G, and B color coordinate values. In a preferred embodiment, a software implementation in the C programming language determines the terms d, q, and m as follows:

```
if ((RG=R-G)>0)
    {if ((GB=G-B)>0)
        {m=B; d=R-B; q=GB;}
    else
        {if (R>B)
            {m=G; d=RG; q=(d<<1) + (d<<2) +GB;}
        else
            {m=G; d=-GB; q=(d<<2) +RG;}
    } }
else
    {if ((BR=B-R)<=0)
        {m=B; d=G-B; q=(d<<1) +BR;}
    else
        {if ((GB=G-B)>0)
            {m=R; d=-RG; q=(d<<1) +BR;}
        else
            {m=R; d=BR; q=(d<<2) +RG;}
    } }
``` where the shift function "<<n" operates as a multiply by $2^n$.

The fourth step is to access the first two-dimensional look-up table 42 with the d and q terms to determine the amount of highlight color, h, to use for the corresponding sample color. The first two-dimensional look-up table 42 is loaded with an array of values for highlight-color amounts that correspond to possible combinations of the d and q values of a corresponding array of sample colors. In this manner, the amount of the highlight color, h, to use is determined.

The fifth step is to access the second two-dimensional look-up table 44 with the d and q terms to retrieve a value therefrom. The sign of the term m is reversed at box 82 so that at the adder 84 the term m is effectively subtracted from the value retrieved from the second two-dimensional look-up table 44 to determine the amount of base color, k, to use for the sample color. The second two-dimensional look-up table 44 is loaded with an array of values that correspond to possible combinations of the d and q terms of a corresponding array of sample colors such that when the values load in the second two-dimensional look-up table 44 have the m term subtracted therefrom, the results are the amounts of base color that correspond to the sample color. In this manner, the amount of the base color to use is determined.

In a preferred embodiment, a software implementation in the C programming language is used to construct both of the two-dimensional look-up tables 42 and 44 as follows:

```
for (d = 0; d <= Cmax; d++)
    {for (q = 0; q <= 6*Cmax; q++)
    {hdiff = q-h1hue*d;
    if (hdiff < 0) hdiff + = 6*d;
    if (hdiff < 2*d)
        {hfTable[d] [q] = d-n*hdiff/2;
                  kfTable[d] [q] = Cmax-d;}
    else
        {if (hdiff < 4*d)
            {hfTable[d] [q] = (1-n)*d;
                      kfTable[d] [q] = Cmax-(1+n)*d-n*hdiff/2;}
        else
            {kfTable[d] [q] = Cmax-(hfTable[d] [q] = (1-3*n)d +
                  hdiff*n/2);}
    } }
``` wherein hfTable[d][q] represents the first two-dimensional look-up table 42, and kfTable[d][q] represents the second two-dimensional look-up table 44. The parameter n is a scale factor that determines the size of a triangle (inside the two-dimensional triangle 12 (see FIG. 2)) formed by a locus of saturated sample colors. The parameter n ranges between 0 and 1 and is typically set to 0.5. Increases in the value of the parameter n result in increases in the differentiation of the saturated colors and decreases in the range of colors available for the mapping of the unsaturated colors. For example, n=1 would map the locus of saturated colors to the boundary of producible colors (i.e., the two-dimensional triangle 12). This gives a maximum differentiation of the saturated colors and maps a third of all color space into gray. The other parameter, hlhue, is a hue parameter related to the highlight color. For example, in a preferred embodiment where the highlight color is defined in an RGB color space with R, G, and B color coordinate values of hlr, hlg, and hlb, respectively, then the parameter hlhue is calculated via a software implementation in the C programming language as follows:

```
if (h1r > h1g)
{if (h1g > h1b) h1hue = 1 - (h1r - h1g)/(h1r - h1b);
   else
   {if (h1r > h1b) h1hue = 5 + (h1r - h1b)/(h1r - h1g);
     else h1hue = 5 - (h1b - h1r)/(h1b - h1g);
} }
else
{if (h1r > h1b) h1hue = 1 + (h1g - h1r)/(h1g - h1b);
   else
   {if (h1g > h1b) h1hue = 3 - (h1g - h1b)/(h1g - h1r);
     else h1hue = 3 + (h1b - h1g)/(h1b - h1r);
} }
```

Finally, the sixth step, indicated at box 52, is the same as that for pictorial images as discussed above.

With respect to the two-dimensional look-up tables 42 and 44 in a preferred embodiment, the same memory is used to store the look-up tables for both the pictorial and presentation image mapping. Depending on which is selected, the memory is preloaded with the respective look-up tables. Alternately, both sets of two-dimensional look-up tables reside persistently in separate memory locations and are accessed in accordance with the type of image being processed. Additionally, with respect to the software implementations in the C programming language in alternate preferred embodiments, software implementations are employed in such other programming languages as appropriate and/or hardware implementations are used to perform the respective calculations.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of image processing for mapping full-color images to highlight-color images comprising:
   (a) reading an input image;
   (b) sampling the image to obtain a sample color;
   (c) obtaining table access values from values that define the sample color;
   (d) using the table access values to access a first two-dimensional look-up table to determine an amount of a highlight color that corresponds to the sample color;
   (e) determining an amount of a base color that corresponds to the sample color; and,
   (f) rendering the image with the highlight and base colors in accordance with their determined amounts.

2. The method according to claim 1, wherein the input image is a pictorial image and the step of obtaining further comprises:
   learning the sample color's coordinate values in a luminance/chrominance color space.

3. The method according to claim 2, wherein the luminance/chrominance color space is a YES color space and the step of learning further comprises:
   learning the sample color's Y, E, and S coordinate values in the YES color space where Y represents luminance, E represents chrominance along a red-green color scale, and S represents chrominance along a yellow-blue color scale.

4. The method according to claim 3, further comprising:
   using the sample color's E and S coordinate values to access the first two-dimensional look-up table.

5. The method according to claim 4, further comprising:
   constructing the first two-dimensional look-up table such that values contained therein satisfy the following relationship:

$$h = \text{MAX}\left\{0, \frac{(E_h E_s + S_h S_s)^3}{(E_s^2 + S_s^2)(E_h^2 + S_h^2)^2}\right\}$$

wherein h is the amount of the highlight color, MAX is a function that returns a value equal to that of its highest argument, $E_s$ is the sample color's E coordinate value, $S_s$ is the sample color's S coordinate value, $E_h$ is an E coordinate value of the highlight color in the YES color space, and $S_h$ is an S coordinate value of the highlight color in the YES color space.

6. The method according to claim 5, wherein the amount of the base color is determined according to the following relationship:

$$k = \text{MAX}\{0, C - h - Y_s + hY_h\}$$

wherein k is the amount of the base color, $C_{max}$ is a maximum of a range of possible coordinate values, $Y_s$ is the sample color's Y coordinate value, and $Y_h$ is a Y coordinate value of the highlight color in the YES color space.

7. The method according to claim 3, further comprising:
   using a second two-dimensional look-up table for determining the amount of the base color that corresponds to the sample color.

8. The method according to claim 7, further comprising:
   using the sample color's Y coordinate value and the determined amount of the highlight color to access the second two-dimensional look-up table.

9. The method according to claim 8, further comprising:
   constructing the second two-dimensional look-up table such that values contained therein satisfy the following relationship:

$$k = \text{MAX}\{0, C_{max} - h - Y_s + hY_h\}$$

wherein k is the amount of the base color, MAX is a function that returns a value equal to that of its highest argument, $C_{max}$ is a maximum of a range of possible coordinate values, h is the determined amount of the highlight color, $Y_s$ is the sample color's Y coordinate value, and $Y_h$ is a Y coordinate value of the highlight color in the YES color space.

10. The method according to claim 3, wherein the image is read in an RGB color space such that the sample color obtained during sampling is defined by an R coordinate value which represents an amount of red, a G coordinate value which represents an amount of green, and a B coordinate value which represents an amount of blue.

11. The method according to claim 10, wherein the step of learning further comprises:
    calculating the sample color's Y, E, and S coordinate values according to the following relationships:

$$Y = \frac{R}{4} + \frac{11G}{16} + \frac{B}{16};$$

$$E = \frac{R-G}{2}; \text{ and,}$$

$$S = \frac{R+G}{4} - \frac{B}{2}.$$

12. The method according to claim 1, wherein the input image is a presentation image and the step of obtaining further comprises:
    determining a value of a term m, wherein the term m represents an amount of white present in the sample color;
    determining a value of a term d, wherein the term d represents a saturation measure of the sample color; and,
    determining a value of a term q, wherein the term q represents a hue measure of the sample color scaled by d.

13. The method according to claim 12, further comprising:
    using the terms d and q to access the first two-dimensional look-up table.

14. The method according to claim 13, further comprising:

subtracting the value of the term m from a value retrieved from a second two-dimensional look-up table accessed with the terms d and q to find the amount of the base color corresponding to the sample color.

15. The method according to claim 14, wherein the image is read in an RGB color space such that the sample color obtained during sampling is defined by an R coordinate value which represents an amount of red, a G coordinate value which represents an amount of green, and a B coordinate value which represents an amount of blue.

16. The method according to claim 15, further comprising:
determining the value of the term m such that it is a minimum of the R, G, and B coordinate values of the sample color.

17. The method according to claim 15, further comprising:
determining the value of the term d such that it is the difference between a maximum and a minimum of the R, G, and B coordinate values of the sample color.

18. The method according to claim 15, further comprising:
determining the value of the term q such that it is a value selected in response to the identity of one of the maximum and intermediate of the R, G, and B color coordinate values, which selected value is adjusted by the intermediate of the R, G, and B color coordinate values less the minimum of the R, G, and B color coordinate values.

19. An image-processing system for mapping full-color images to highlight-color images comprising:

an image-input terminal that reads an image represented in a full-color scheme defined by a three-dimensional color space;
an image-processing unit which (i) samples the image to obtain a sample color, and (ii) maps the sample color from the full-color scheme to a highlight-color scheme defined by a two-dimensional color space that includes a highlight color and a base color, said image-processing unit including;
at least a first two-dimensional look-up table which is used in mapping the sample color from the full-color scheme to the highlight-color scheme; and,
an image-output terminal that renders the image in the highlight-color scheme.

20. The image-processing system according to claim 19, wherein the first two-dimensional look-up table is used to determine an amount of the highlight color that corresponds to the sample color.

21. The image-processing system according to claim 19, wherein the image-processing unit further includes:
a second two-dimensional look-up table that is used in mapping the sample color from the full-color scheme to the highlight-color scheme.

22. The image-processing system according to claim 21, wherein the second two-dimensional look-up table is used to determine an amount of the base color that corresponds to the sample color.

23. The image-processing system according to claim 22, wherein the first two-dimensional look-up table is used to determine an amount of the highlight color that corresponds to the sample color.

* * * * *